United States Patent
Ko et al.

(10) Patent No.: US 11,349,140 B2
(45) Date of Patent: May 31, 2022

(54) ANTIOXIDANT FOR ELECTROLYTE MEMBRANE OF FUEL CELLS AND METHOD FOR PREPARING THE SAME

(71) Applicants: Hyundai Motor Company, Seoul (KR); Kia Motors Corporation, Seoul (KR)

(72) Inventors: Jae Jun Ko, Gyeonggi-do (KR); Bo Ki Hong, Seoul (KR); In Yu Park, Seoul (KR); Hyoung Juhn Kim, Seoul (KR); So Young Lee, Seoul (KR); Song I Oh, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 100 days.

(21) Appl. No.: 16/233,467

(22) Filed: Dec. 27, 2018

(65) Prior Publication Data

US 2020/0020967 A1 Jan. 16, 2020

(30) Foreign Application Priority Data

Jul. 10, 2018 (KR) .................. 10-2018-0080063

(51) Int. Cl.
| | | |
|---|---|---|
| *H01M 8/1051* | (2016.01) | |
| *C09K 15/02* | (2006.01) | |
| *C09K 15/32* | (2006.01) | |
| *H01M 8/10* | (2016.01) | |

(52) U.S. Cl.
CPC .......... *H01M 8/1051* (2013.01); *C09K 15/02* (2013.01); *C09K 15/328* (2013.01); *H01M 2008/1095* (2013.01); *H01M 2250/20* (2013.01)

(58) Field of Classification Search
CPC ........ H01M 8/1051; H01M 2008/1095; C09K 15/02; C09K 15/328
See application file for complete search history.

(56) References Cited

U.S. PATENT DOCUMENTS

2006/0254130 A1* 11/2006 Scattergood ............ C10L 10/02
44/457
2014/0335440 A1* 11/2014 Kunita ................ H01M 8/1051
429/492

FOREIGN PATENT DOCUMENTS

| CN | 1841679 A | * 10/2006 |
|---|---|---|
| KR | 10-2013-0106074 A | 9/2013 |
| KR | 10-2013-0110569 A | 10/2013 |

OTHER PUBLICATIONS

Wang et al., Composite Membrane Based on SiO2-MWCNTs and Nation for PEMFCs, 2012, Jounral of the Electrochemical Society, F490-F493 (Year: 2012).*
Takenaka et al., Preparation of carbon nanotube-supported metal nanoparticles coated with silica layers, 2008, Journal of Catalysis, 345-355 (Year: 2008).*
Yue Tian et al., ACS Appl. Material Interfaces , 6, 15, 12038-12045 (2014).

* cited by examiner

*Primary Examiner* — Zhongqing Wei
(74) *Attorney, Agent, or Firm* — Mintz Levin Cohn Ferris Glovsky and Popeo, P.C.; Peter F. Corless

(57) ABSTRACT

Disclosed is an antioxidant for an electrolyte membrane of fuel cells. The antioxidant may include a support including silicon dioxide and having a nanotube shape, and a metal oxide supported on the support.

11 Claims, 13 Drawing Sheets

ANTIOXIDANT FOR ELECTROLYTE MEMBRANE OF FUEL CELLS AND METHOD FOR PREPARING THE SAME

CROSS-REFERENCE TO RELATED APPLICATION

This application claims, under 35 U.S.C. § 119A, the benefit of priority to Korean Patent Application No. 10-2018-0080063 filed on Jul. 10, 2018, the entire contents of which are incorporated herein by reference.

TECHNICAL FIELD

The present invention relates to an antioxidant having improved durability and conductivity for an electrolyte membrane for fuel cells and a method for preparing the same.

BACKGROUND

Polymer electrolyte membrane fuel cells (PEMFCs) have been used as fuel cells for vehicles. In order for these polymer electrolyte membranes to exhibit high power, the electrolyte membranes should be stably operated within a wide current density range.

In typical PEMFCs, hydrogen and oxygen in the air, which are reaction gases for fuel cells, crossover through an electrolyte membrane to facilitate production of hydrogen peroxide (HOOH). The hydrogen peroxide produces oxygen-containing radicals such as a hydroxyl radical (.OH) and a hydroperoxyl radical (.OOH). Accordingly, the produced radicals is reactive to a perfluorinated sulfonic acid-based electrolyte membrane, inducing chemical degradation of the membrane, which reduces durability of fuel cells.

Meanwhile, in order to mitigate such chemical degradation of the electrolyte membrane, addition of various kinds of antioxidants to the electrolyte membrane has been suggested. The antioxidants may include primary antioxidants functioning as radical scavengers or quenchers and secondary antioxidants functioning as hydrogen peroxide decomposers. In particular, representative primary antioxidants may include cerium-based antioxidants, terephthalic acid-based antioxidants and the like.

Conventional antioxidants have problems, for example, when those are added to perfluorinated sulfonic acid-based ionomer-based electrolyte membranes, the antioxidants may react with sulfonic acid groups of the electrolyte membranes, which may decrease proton conductivity and cause deterioration in power of fuel cell electric vehicles. Nanoparticle antioxidants may also be readily agglomerated. For this reason, in order to obtain electrolyte membranes with high performance and durability, there is a need for development of materials that can impart excellent dispersibility to antioxidants without decreasing proton conductivity.

The above information disclosed in this Background section is provided only for enhancement of understanding of the background of the invention and therefore it may contain information that does not form the prior art that is already known in this country to a person of ordinary skill in the art.

SUMMARY OF THE INVENTION

In preferred aspects, the present invention provides an antioxidant that may include metal oxide supported on the surface of a support including silicon dioxide ($SiO_2$), which may be stable even under strong acidic conditions and fix the antioxidant on an electrolyte membrane for fuel cells. Preferably, the antioxidant may be formed in crystal particles, having a size in nanometer scale.

Alternatively, the antioxidant may include a coordinate bond formed between a silicon compound having two or more amine groups and a metal ion incorporated as a precursor and conduct oxidation to support metal oxide on a silicon dioxide support.

Accordingly, the present invention may provide an electrolyte membrane with high durability and high proton conductivity by including a nanotube-type support as a hydrophilic silicon dioxide support.

In one aspect, provided is an antioxidant for an electrolyte membrane of fuel cells. The antioxidant may include a support including silicon dioxide and a metal oxide including a metal component and supported on the support. The support may be suitable formed in a nanotube shape.

The term metal oxide as used herein includes a metal (or metal component) that is present together with oxygen in the form of oxide ion (e.g., $O^{2-}$).

The "metal component" as used herein includes a metal ion that may form an ionic bonds with anion, elemental metal atom, or a metal atom covalently bonded to other atoms (e.g., oxygen). In certain aspect, the metal component may suitably include one or more selected from alkali metals, rare earth metals, and transition metals. Preferably, the metal component may include Ce atoms (elemental Ce or Ce covalently bonded to other atoms) or cerium ions (e.g., $Ce^{2+}$, $Ce^{3+}$, or $Ce^{4+}$).

The "nanotube" as referred to herein includes a tubular or cylindrical shape, which has a longest dimension (length) less than about 990 nm, 950 nm, 900 nm, 800 nm, 700 nm, 600 nm, 500 nm, 400 nm, 300 nm, 200 nm, or 100 nm. The nanotube may be formed to include a hollow shape or structure so it may have substantially increased surface area. In certain embodiments, the nanotube may include or be modified with functional groups (e.g., $SiO_2$, chelate groups or metals) attached on the surface thereof to provide chemical and/or physical functionality.

Preferably, a surface of the support may be modified with a silicon compound comprising one or more amine groups. Preferably, the metal oxide may be supported on the surface of the support.

The term "modified" or "modification" as used herein refers to a change introduced, induced or involvled by one or more chemical reactions and/or physical processes. In certain aspects, the modification may occur chemical reactions, such as substitution, addition, alkylation, oxidation or reduction, without limiting the scope thereof. For example, the modified compound may suitably include functional groups or additional components (e.g., particles) where the chemical/physical processes are effectively performed.

The silicon compound may suitably include 3-aminopropyl triethoxysilane.

Alternatively, a surface of the support may suitably include one or more chelate compounds comprising the metal component of the metal oxide and a silicon compound having two or more amine groups and the metal oxide is supported on the surface of the support Preferably, the metal component may include a metal ion.

The silicon compound may suitably include one or more from the group consisting of N-[3-(trimethoxysilyl)propyl] ethylene diamine, and N-[3-(dimethoxysilyl)propyl]ethylene diamine.

The metal oxide may suitably include one or more selected from one or more selected from pure cerium oxide ($CeO_2$) and modified cerium oxide. For example, the modified cerium oxide may suitably include cerium-zirconium oxide ($Ce_{1-x}Zr_xO_2$, in which x is 0.2 to 0.8), cerium-manganese oxide ($Ce_{1-x}Mn_xO_2$, in which x is 0.2 to 0.8), cerium oxide-doped yttrium oxide, and cerium oxide-doped zirconium oxide.

The support may suitably have a length of 10 nm to 700 nm.

The antioxidant may suitably include the metal oxide in an amount of about s 0.1% by weight to 30% by weight, based on the total weight of the antioxidant.

In another aspect, provided is an electrolyte membrane for fuel cells including an antioxidant as described herein and an ionomer.

The term "ionomer" as used herein refers to a polymeric material or resin that includes ionized groups attached (e.g. covalently bonded) to the backbone of the polymer as pendant groups. Preferably, such ionized groups may be functionalized to have ionic characteristics, e.g., cationic or anionic. In certain aspect, the ionomer may suitably include ionic groups involved in electron and/or proton transfer in an electrolyte of a battery cell. A content of the metal oxide present in the antioxidant may be suitably of about 0.01% by weight to 5% by weight, based on the total weight of the ionomer.

In another aspect, provided is a method for preparing an antioxidant for an electrolyte membrane of fuel cells. The method may include a) forming a support in a nanotube shape from a silicon dioxide precursor, and b) supporting a metal oxide comprising a metal component on the support.

The silicon dioxide precursor may suitably include tetraethyl orthosilicate.

The method may further include modifying a surface of the support by adding a silicon compound having one or more amine groups the support formed in the step a) before step b).

The silicon compound may suitably include 3-aminopropyl triethoxysilane.

The method may further include, before step b), preparing a chelate compound by forming a coordinate bond between the metal component of the metal oxide and a silicon compound having two or more amine groups to prepare a chelate compound, and disposing the chelate compound on a surface of the support. Preferably, the metal component may include a metal ion.

The silicon compound may suitably include one or more selected from the group consisting of N-[3-(trimethoxysilyl)propyl]ethylene diamine, and N-{3-[dimethoxy(methyl)silyl]propyl}-1,2-ethanediamine.

A precursor of the metal oxide may suitably include one or more selected from the group consisting of cerium nitrate hexahydrate ($Ce(NO_3)_3.6H_2O$), cerium carbonate ($Ce(CO_3)_3.xH_2O$ (in which x is 7 to 8), cerium trichloride ($CeCl_3$), cerium (IV) sulfate ($Ce(SO4)2$), and cerium acetate ($Ce(CH_3COO)_3.H_2O$).

Still provided is a fuel cell including the antioxidant as described herein.

Further provided is a vehicle that includes the fuel cell as described herein.

Other aspects of the invention are disclosed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

DETAILED DESCRIPTION

Figure 1:
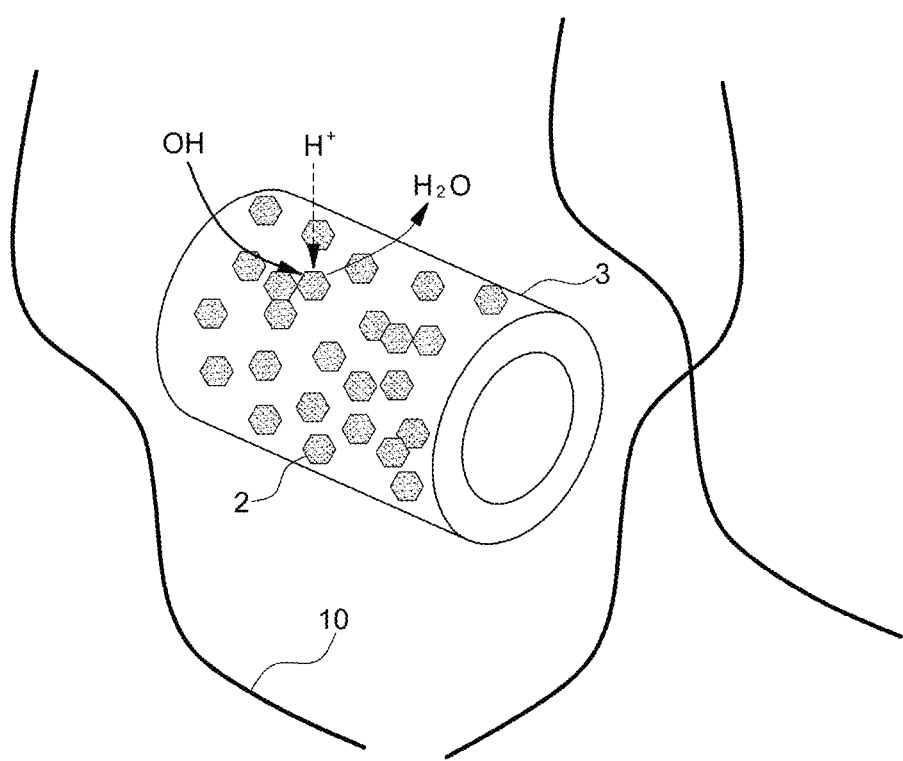
FIG. 1 shows an exemplary cerium oxide-supported silicon dioxide ($SiO_2$) nanotube structure and a radical (.OH) scavenging mechanism according to an exemplary embodiment of the present invention.

Hereinafter, preferred embodiments of the present invention will be described in detail with reference to the annexed drawings. Advantages and features of the present invention and methods for accomplishing the same will be clearly understood from the following preferred embodiments with reference to the annexed drawings. However, the present invention is not limited to the embodiments and will be embodied in different forms. The embodiments are suggested only to offer thorough and complete understanding of the disclosed contents and to sufficiently inform those skilled in the art of the technical concept of the present invention. The scope of the present invention is defined only by claims. Like reference numbers refer to like elements throughout the description of the figures.

Unless differently defined, all terms used herein (including technical and scientific terms) have the same meanings as generally understood by those skilled in the art to which the present invention pertains. In addition, terms identical to those defined in generally used dictionaries should be interpreted as having meanings identical to contextual meanings of the related art, and are not interpreted as having ideal or excessively formal meanings unless they are clearly and particularly defined in the present specification.

In addition, terms herein used are provided only for illustration of embodiments and should not be construed as limiting the scope of the present invention. Singular forms are intended to include plural forms as well, unless context clearly indicates otherwise. It will be further understood that the terms "comprises", "includes" and the like, when used in this specification, specify the presence of stated elements, features, numbers, steps and/or operations, but do not preclude the presence or addition of one or more other elements, features, numbers, steps and/or operations. In addition, "and/or" includes each of the mentioned items and a combination of one or more thereof.

In addition, it will be understood that when an element such as a layer, film, region or substrate is referred to as being "on" another element, it can be directly on the other element or an intervening element may also be present. It will also be understood that, when an element such as a layer, film, region or substrate is referred to as being "under" another element, it can be directly under the other element or an intervening element may also be present.

Unless context clearly indicates otherwise, all numbers, figures and/or expressions that represent ingredients, reaction conditions, polymer compositions and amounts of mixtures used in the specification are approximations that reflect various uncertainties of measurement occurring inherently in obtaining these figures among other things. For this reason, it should be understood that, in all cases, the term "about" should modify all the numbers, figures and/or expressions.

For example, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the range. In addition, for example, the range of "10% to 30%" encompasses all integers that include numbers such as 10%, 11%, 12% and 13% as well as 30%, and any sub-ranges of 10% to 15%, 12% to 18%, or 20% to 30%, as well as any numbers, such as 10.5%, 15.5% and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Hereinafter, the present invention will be described in more detail with reference to the annexed drawings.

In one aspect, provided is an antioxidant of the electrolyte membrane for fuel cells that may include metal oxide, for example, cerium oxide. Cerium oxide may suitably include pure cerium oxide ($CeO_2$) and modified cerium oxide (modified $CeO_2$). The modified cerium oxide may suitably include cerium-zirconium oxide ($Ce_{1-x}Zr_xO_2$, x=0.2~0.8) and cerium-manganese oxide ($Ce_{1-x}Mn_xO_2$, x=0.2~0.8). For example, the modified cerium oxide may be a mixture of cerium-zirconium oxide ($Ce_{1-x}Zr_xO_2$, x=0.2~0.8) and cerium-manganese oxide ($Ce_{1-x}Mn_xO_2$, x=0.2~0.8).

For instance, the antioxidant may suitably include pure cerium oxide ($CeO_2$) supported on a support, but the present invention is not limited thereto. In addition, the term "antioxidant" mentioned herein refers to a primary antioxidant.

FIG. 1 shows a cerium oxide-supported silicon dioxide ($SiO_2$) nanotube structure and a radical (.OH) scavenging mechanism according to exemplary embodiments of the present invention.

Preferably, the antioxidant may include a support including chemically stable silicon dioxide and metal oxide supported on the support. For example, as shown in FIG. 1, cerium oxide 2 supported on a silicon dioxide ($SiO_2$) nanotube 3 may constitute an antioxidant, which may be incorporated into an electrolyte membrane based on an ionomer 10 (for example, a perfluorinated sulfonic acid-based ionomer). In such an antioxidant, cerium oxide 2 may prevent oxidation of the electrolyte membrane by scavenging radicals, while retaining a well-dispersed morphology with a small crystallite size.

Cerium oxide, which is used as a common antioxidant to improve chemical durability of electrolyte membranes, may have problems in that, when excessively added, cerium oxide forms an ionic bond with a sulfur trioxide anion ($-SO_3^-$) of a sulfonic acid group positioned at an ionomer end group in the electrolyte membrane, thereby causing deterioration in proton conductivity of the electrolyte membrane. However, when cerium oxide is supported on a nanotube-type silicon dioxide support, deterioration in proton conductivity may be suppressed, because the silicon dioxide constituting the support may be chemically hydrophilic and the nanotube-type structure may provide high water scavenging or absorbance activity. Accordingly, deterioration in proton conductivity due to cerium oxide used as an antioxidant may be suppressed and high proton conductivity may thus be maintained.

In addition, in the related arts, mutual agglomeration may occur in cerium oxide particles with excellent antioxidant activity through nanometer (nm) or several tens of nanometer-scale van der Waals force. However, when supporting cerium oxide on a support, a wide surface area may be imparted to the cerium oxide by uniformly distributing the cerium oxide. Accordingly, antioxidant activity may be further improved. The support used to support metal oxide may be structurally stable and has chemical durability and thermal durability even in the presence of a strong acid and heat.

Additionally, in the related art, when cerium oxide produced to have a wide surface area, rather than supporting on a support, is injected into an electrolyte membrane, cerium oxide may be discharged into the outside of the electrolyte membrane due to dissolution and migration, which may cause deterioration in durability of the electrolyte membrane.

To the contrary, when cerium oxide, which is grown from a cerium precursor and is supported on a silicon dioxide nanotube, is provided, cerium oxide and silicon dioxide may be bonded in the form of Si—O—Ce. Since silicon dioxide is an oxide that has considerably low solubility even under strong acidic conditions, dissolution and migration of cerium oxide may be suppressed due to a chemical bond such as a Si—O—Ce bond.

Consequently, by using the antioxidant according to various exemplary embodiments of the present invention, an electrolyte membrane with high durability and high proton conductivity may be provided, while avoiding agglomeration of cerium oxide.

Figure 2:
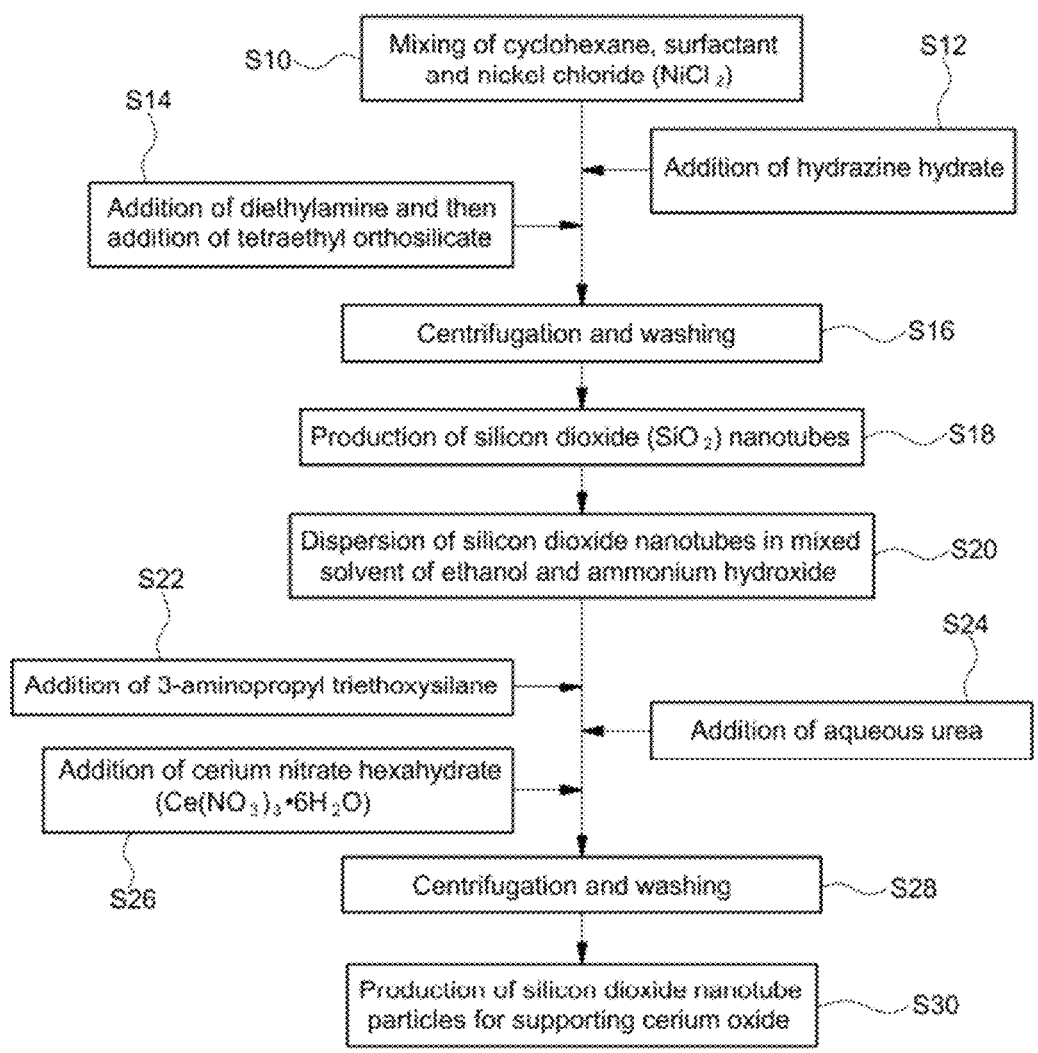
FIG. 2 is a flowchart illustrating an exemplary method for preparing an exemplary cerium oxide supported on an exemplary silicon dioxide nanotube according to an exemplary embodiment of the present invention.
Figure 3:
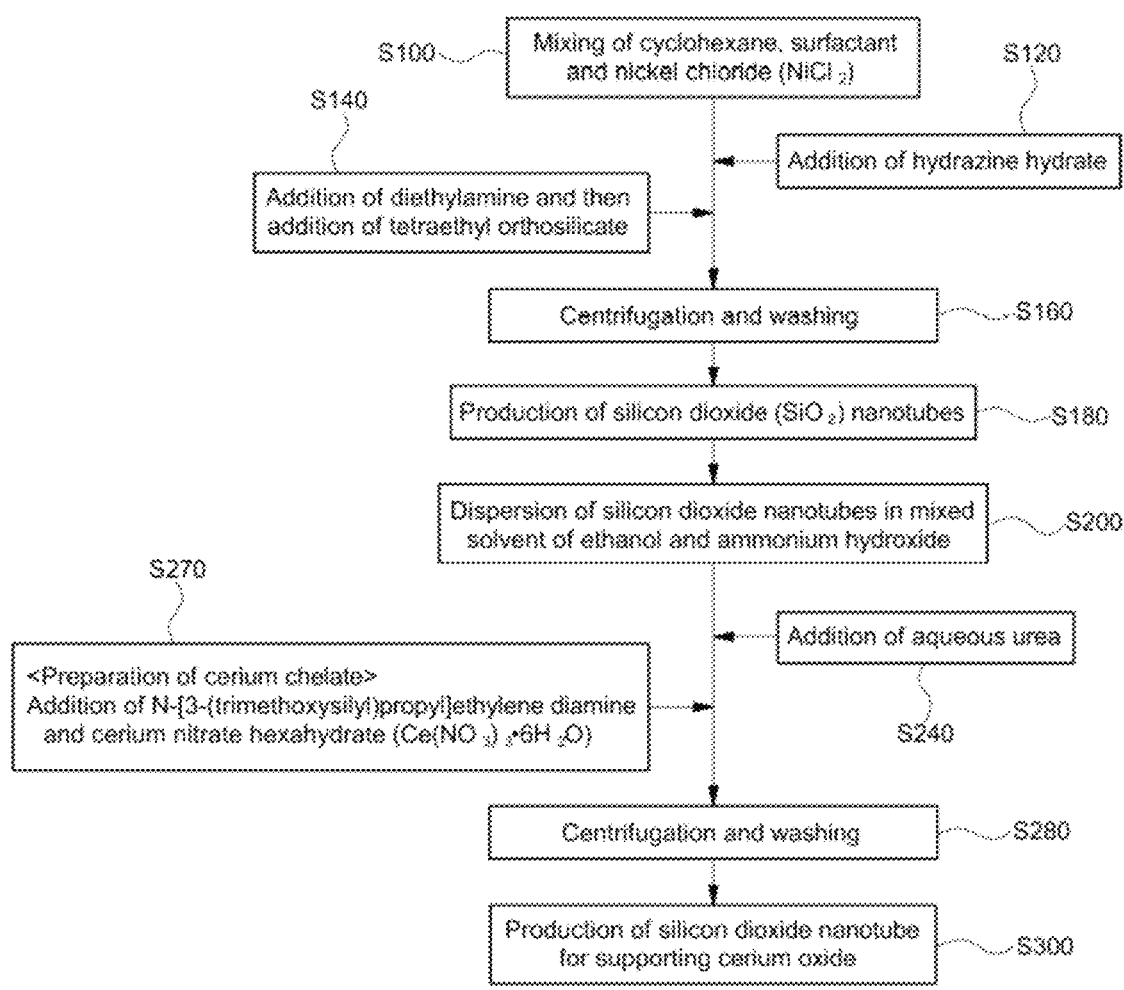
FIG. 3 is a flowchart showing an exemplary method for preparing cerium oxide supported on an exemplary silicon dioxide nanotube according to an exemplary embodiment of the present invention.

Hereinafter, a method for preparing cerium oxide supported on a silicon dioxide nanotube will be described with reference to FIGS. 2 and 3. FIG. 2 is a flowchart schematically illustrating a method for preparing cerium oxide supported on a silicon dioxide nanotube according to an exemplary embodiment of the present invention. FIG. 3 is a flowchart schematically illustrating an exemplary method for preparing cerium oxide supported on an exemplary silicon dioxide nanotube according to an exemplary embodiment of the present invention.

As described above, in order for an antioxidant to function well in an electrolyte membrane, it is important for cerium oxide with a uniform size to be uniformly distributed on the surface of silicon dioxide. When the bonding strength between cerium oxide and silicon dioxide is deteriorated in the preparation process, detachment or segregation between the two substances readily may occur, which cerium oxide may not be supported sufficiently. Accordingly, agglomeration between cerium oxide may occur, which results in deterioration in antioxidant functions and acceleration of chemical degradation of the electrolyte membrane in a local area where the antioxidant is absent. As a result, in order to expect high durability of the electrolyte membranes, cerium oxide may be bonded well to silicon dioxide as the support and its support state may be maintained well under electrolyte membrane preparation and fuel cell operation environments.

FIGS. 2 and 3 show the most distinguishing feature of the method for preparing an antioxidant for an electrolyte membrane of fuel cells according to exemplary embodiments of the present invention. For instance, the method may include a) producing or forming a support having a nanotube shape from a silicon dioxide precursor and b) supporting metal oxide on the support. Preferably, the metal oxide may include a metal component, which may suitably include a metal ion or covalently bonded metal atom.

The method for preparing an antioxidant for an electrolyte membrane of fuel cells a may further include, before step b), modifying the surface of the support by adding a silicon compound having one or more amine groups thereto (pre-modification of silicon dioxide surface). An exemplary preparation method is described below.

Preparation Method of Example 1

① 8.5 g of Brij® 58 (Sigma Aldrich Co., USA) as a surfactant is dissolved in 15 ml of cyclohexane (Sigma Aldrich Co., USA) as a solvent at 50° C. to form an inverse micelle structure.

② 1.3 ml of a solution of 0.8M nickel chloride ($NiCl_2$) in deionized water is added to the mixture solution obtained in step ①, followed by stirring until a homogenous state is obtained (S10).

③ 0.45 ml of hydrazine hydrate is added dropwise to the mixture solution obtained in step ② under stirring (S12).

④ 1 ml of diethylamine is added to the mixture solution prepared in step ③ and tetraethyl orthosilicate as a silicon dioxide precursor is added thereto to grow silicon dioxide nanotubes (S14).

⑤ The precipitate is separated using a centrifuge and the solvent present on the precipitate is washed out with alcohol, and nickel and hydrazine are then washed with an acid (S16).

⑥ In order to remove the acidic ingredient from the silicon dioxide nanotubes of the precipitate obtained in step ⑤, the precipitate is washed with deionized water five times and then dried (S18).

⑦ The silicon dioxide nanotubes are dispersed in a mixed solvent consisting of 50 ml of ethanol and 3 ml of ammonium hydroxide (S20).

⑧ The silicon dioxide nanotubes are reacted with 2.5 mL of 3-aminopropyl triethoxysilane (Sigma Aldrich Co., USA) for 24 hours to modify the silicon dioxide nanotube surface (S22).

⑨ The reaction solution obtained in step ⑧ is reacted with a solution (1 g/5 ml) of aqueous urea in deionized water at 85° C. for 15 minutes (S24).

⑩ A solution of 0.1 g cerium nitrate hexahydrate in 1 ml of distilled water is added dropwise to the mixture dispersion obtained in step ⑨, followed by proceeding reaction at 85° C. for 12 hours (S26).

⑪ The mixture solution prepared in step ⑩ is centrifuged to obtain a cerium-based antioxidant supported on solid-phase silicon dioxide nanotube particles (S28).

⑫ The supported cerium-based antioxidant is washed with deionized water several times and then dried to obtain a final cerium-based antioxidant sample supported on silicon dioxide nanotube particles (S30).

In the preparation method of Example 1, the silicon dioxide support may be surface-modified with ammonium hydroxide and 3-aminopropyl triethoxysilane as a compound having one or more amine groups, and cerium may be then supported on the silicon dioxide support through a cerium salt.

For instance, 3-aminopropyl triethoxysilane is a silicon compound having a molecular formula of $C_9H_{23}N_1O_3Si$ (molecular weight: 221.37 g/mol), which has a structure represented by the following Formula 1.

[Formula 1]

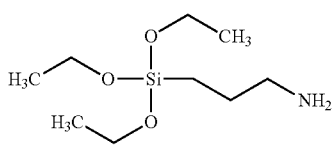

As shown in FIG. 3, the method may further include: before step b), forming a coordinate bond between a metal component (e.g., metal ion) of the metal oxide and a silicon compound having two or more amine groups to prepare a chelate compound. In addition, the method may further include disposing the chelate compound on the surface of the support (pre-preparation and mixing of nanotube-type cerium chelate for supporting cerium oxide). Preferably, silicon dioxide nanotubes may be produced, and cerium oxide may be then supported on the silicon dioxide nanotubes, as the chelate compound of the metal ion (for example, cerium ion) and the substance having two or more amine groups. An exemplary preparation method will be given below.

Preparation Methods of Examples 2 to 6

① 8.5 g of Brij® 58 (Sigma Aldrich Co., USA) as a surfactant is dissolved in 15 ml of cyclohexane (Sigma Aldrich Co., USA) as a solvent at 50° C. to form an inverse micelle structure.

② 1.3 ml (Examples 2 to 5) or 1.9 ml (Example 6) of a solution of 0.8M nickel chloride ($NiCl_2$) in deionized water is added to the mixture solution obtained in step ①, followed by stirring until a homogenous state is obtained (S100).

③ 0.45 ml of hydrazine hydrate is added dropwise to the mixture solution obtained in step ② under stirring (S120).

④ 1 ml of diethylamine is added to the mixture solution prepared in step ③ and tetraethyl orthosilicate as a silicon dioxide precursor is added thereto to grow silicon dioxide nanotubes (S140).

⑤ The precipitate is separated using a centrifuge and the solvent present on the precipitate is washed out with alcohol, and nickel and hydrazine are washed with an acid (S160).

⑥ In order to remove the acidic ingredient from the silicon dioxide nanotubes of the precipitate obtained in step ⑤, the precipitate is washed with deionized water five times and then dried (S180).

⑦ The silicon dioxide nanotubes are dispersed in a mixed solvent consisting of 50 ml of ethanol and 3 ml of ammonium hydroxide (S200).

⑧ The reaction solution obtained in step ⑦ is reacted with a solution (1 g/5 ml) of aqueous urea in deionized water at 85° C. for 15 minutes (S240).

⑨ A solution of 0.1 g (Examples 2 and 6) or 0.5 g (Examples 3 to 5) of cerium nitrate hexahydrate in 2 ml of N-[3-(trimethoxysilyl)propyl]ethylene diamine is added dropwise to the dispersion obtained in step ⑧, followed by proceeding reaction at 85° C. for 12 hours (S270).

⑩ The mixture solution prepared in step ⑨ is centrifuged to obtain a cerium-based antioxidant supported on solid-phase silicon dioxide nanotube particles (S280).

⑪ The supported cerium-based antioxidant is washed with deionized water several times and then dried to obtain a final cerium-based antioxidant sample supported on silicon dioxide nanotube particles (S300).

The preparation methods of Examples 2 to 6 may improve bonding strength (Si—O—Ce bonding property) between cerium oxide and silicon dioxide by using N-[3-(trimethoxysilyl)propyl]ethylene diamine and thus enable cerium oxide to be supported uniformly and efficiently. N[3-(trimethoxysilyl)propyl]ethylene diamine is a silicon compound having a molecular formula of $C_8H_{22}N_2O_3Si$ (molecular weight: 222.4 g/mol), which has a structure represented by the following Formula 2.

[Formula 2]

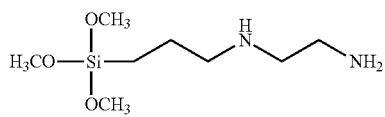

When cerium nitrate hexahydrate used as a precursor of cerium is stirred with N-[3-(trimethoxysilyl)propyl] ethylene diamine, a cerium ion may be coordinately bonded with two amines (—NH, —$NH_2$) to form a chelate compound, which enables cerium to maintain its stable form. Subsequently, silicon (Si) is adsorbed on the surface of silicon dioxide that has the same property, and impurities are washed out with an aqueous element, which forms strong bonding strength between cerium oxide and silicon dioxide Meanwhile, the particle size of silicon dioxide may be considered important in the process of incorporating cerium oxide supported on silicon dioxide nanotubes into an electrolyte membrane. The silicon dioxide nanotubes serving as the support preferably may have a length of about 10 nm to 700 nm, or particularly of about 20 nm to 300 nm. When the length of silicon dioxide nanotubes is less than about 10 nm, the nanotubes may lose their inherent structural properties and water scavenging or absorbance activity When the length of nanotubes is greater than about 700 nm, i nanotubes may not be uniformly dispersed in the electrolyte membrane due to excessively large size.

The amount of cerium oxide supported may be considered important in order to obtain an antioxidant with excellent required properties. The amount of cerium oxide supported may be of about 0.1% by weight to 30% by weight, or particularly of about 0.5% by weight to 20% by weight, based on the total weight of the antioxidant, which is the sum of contents of the support and metal oxide). When the amount of cerium oxide supported is less than about 0.1% by weight, the frequency that hydrophilic silicon dioxide nanotubes capable of scavenging or absorbing water contacts water may be increased, which subsequently may include the proton conductivity of the electrolyte membrane. Accordingly, agglomeration of cerium oxide may be decreased, but antioxidant activity may not be sufficiently obtained, swelling of the electrolyte membrane may be excessively increased and the mechanical strength of electrolyte membrane may be deteriorated. When the amount of cerium oxide supported is greater than about 30% by weight, antioxidant activity may be sufficiently obtained, and deterioration in mechanical strength due to swelling of the electrolyte membrane may be decreased. However, the proton conductivity of the electrolyte membrane may be deteriorated and unnecessary movement by heat may be serious due to agglomeration of cerium oxide, thereby deteriorating stability of cerium oxide.

The content of cerium oxide supported on the support may also be considered important in order to obtain the antioxidant activity of fuel cell electrolyte membranes. Based on the total weight of ionomer used to manufacture an electrolyte membrane, the content of cerium oxide may be of about 0.01% by weight to 5% by weight, or particularly about 0.08% by weight to 1% by weight based on the total weight of the antioxidant. When the content of cerium oxide is less than about 0.01% by weight, the antioxidant effect may be insufficient. When the content of cerium oxide is greater than about 5% by weight, the proton conductivity of the electrolyte membrane may be deteriorated.

In addition, heat treatment temperature of the antioxidant may be considered important for crystal growth of cerium oxide. For instance, the heat treatment temperature is of about 100° C. to 1000° C., or particularly of about 200° C. to 600° C., to improve durability by increasing the crystal size of cerium oxide of the antioxidant. When the heat treatment temperature is less than about 100° C., durability may not be improved due to insufficient crystal growth of cerium oxide. When the heat treatment temperature is greater than about 1000° C., antioxidant activity may be greatly decreased due to excessively large crystal size of cerium oxide.

Figure 4:
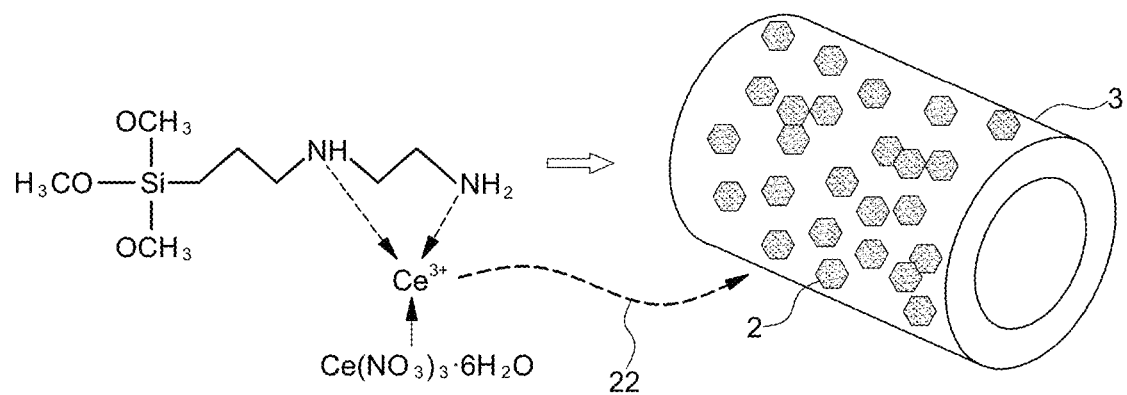
FIG. 4 shows an exemplary cerium oxide-supported silicon dioxide nanotube structure in Examples 2 to 6 according to an exemplary embodiment of the present invention.

A method for preparing an antioxidant for an electrolyte membrane of fuel cells according to various exemplary embodiments (for example, Examples 2 to 6) will be described hereinafter. FIG. 4 shows a cerium oxide-supported silicon dioxide nanotube structure according to exemplary embodiments of the present invention. For example, cerium oxide 2 undergoing crystal growth 22 is supported on a silicon dioxide support 3 (that is, silicon dioxide nanotube) produced from tetraethyl orthosilicate (TEOS) using N-[3-(trimethoxysilyl)propyl]ethylene diamine and cerium nitrate hexahydrate as a cerium precursor. Preferably, the cerium oxide 2 may be uniformly supported and the amount of cerium oxide 2 supported may be controlled by controlling contents of N-[3-(trimethoxysilyl)propyl]ethylene diamine and cerium nitrate hexahydrate.

The cerium precursor may suitably include N-[3-(trimethoxysilyl)propyl]ethylene diamine having two amine groups and cerium nitrate hexahydrate but the present invention is not limited thereto. For example, instead of N-[3-(trimethoxysilyl)propyl]ethylene diamine, the cerium precursor may suitably include N-{3-[dimethoxy(methyl)silyl]propyl}-1,2-ethanediamine including two or more amine groups and silicate and having a molecular weight of 206.3 g/mol. In addition, the cerium precursor may suitably include cerium carbonate ($Ce(CO_3)_3 \cdot xH_2O$ (in which x is 7 to 8), cerium trichloride ($CeCl_3$), cerium (IV) sulfate ($Ce(SO_4)_2$), and cerium acetate ($Ce(CH_3COO)_3 \cdot H_2O$).

Figure 5A:
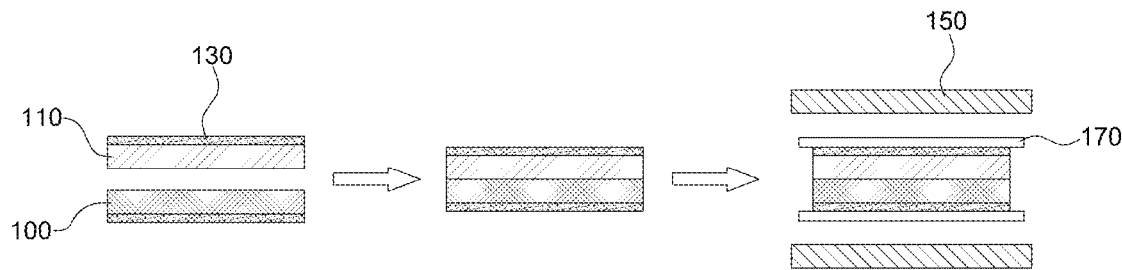
FIG. 5A shows an exemplary cerium migration test process of an exemplary antioxidant including an exemplary cerium oxide-supported silicon dioxide nanotube according to an exemplary embodiment of the present invention.
Figure 5B:
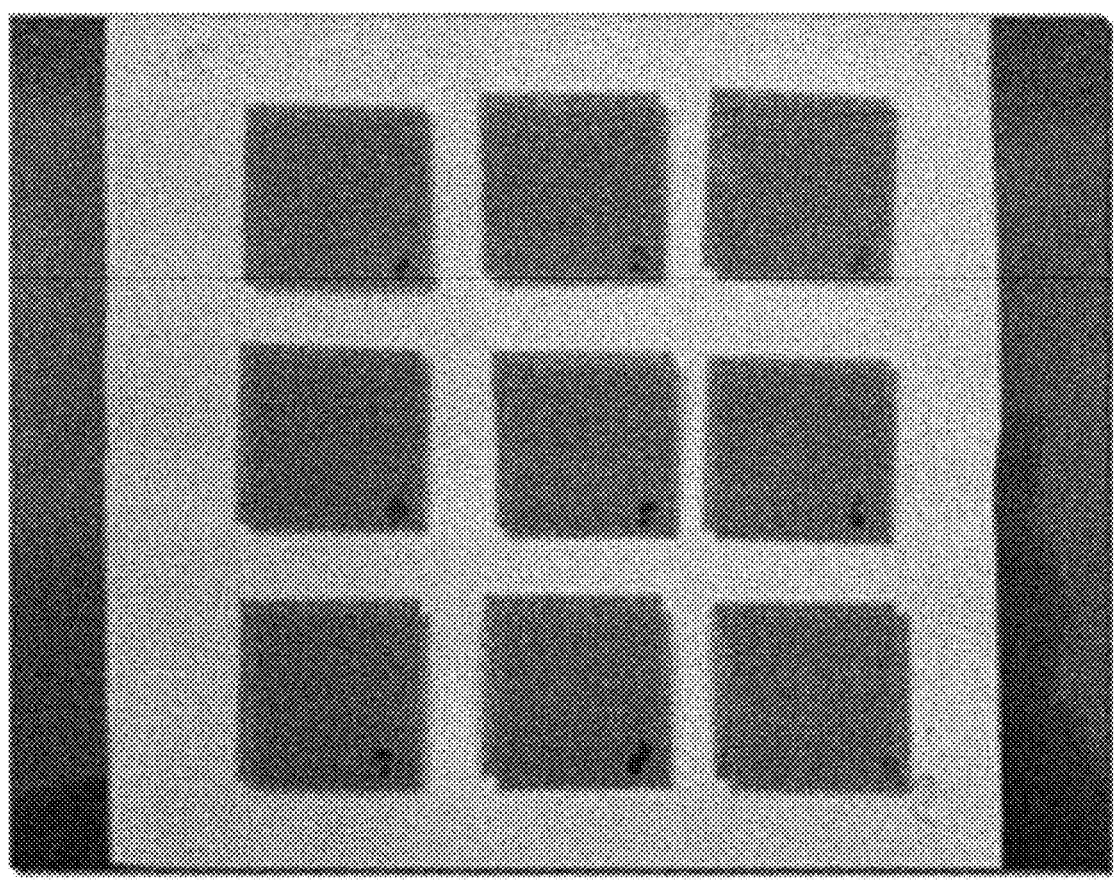
FIG. 5B is a plan view illustrating an exemplary product according to the cerium migration test process shown in FIG. 5A.

A stability test method of the antioxidant for an electrolyte membrane of fuel cells according to exemplary embodiments of the present invention will be described. FIG. 5A shows an exemplary cerium migration test process of an exemplary antioxidant including an exemplary cerium oxide-supported silicon dioxide nanotube. FIG. 5B shows a plan view illustrating a sample produced according to the cerium migration test process shown in FIG. 5A.

FIG. 5A provides a migration test method using heat to evaluate the stability of the cerium oxide antioxidant supported on a silicon dioxide nanotube. For instance, the electrolyte membrane may be produced to a size of 3 cm×3 cm and a cerium-free membrane 110 may be produced such that it excludes cerium oxide. The temperature and pressure for joining may be 120° C. and 0.1 kgf /cm², respectively, and pressing may be carried out for 2 minutes using a hot press 150 for uniformly applying a pressure to the entire area.

The content of cerium moved by heat is measured by X-ray fluorescence (XRF) and then compared with Ce μg/[cm²·cm] (cerium weight/unit area·unit thickness). In addition, the content of cerium moved by heat is calculated in accordance with the following equation by measuring the amount of cerium moved from an electrolyte membrane 100 including cerium oxide to a cerium-free membrane 100 (or cerium-free target electrolyte membrane) after hot pressing test.

Weight of cerium moved into electrolyte membrane (wt %) =

$$\frac{\text{Amount of cerium in target electrolyte membrane after hot pressing test}}{\text{Amount of cerium in electrolyte membrane containing cerium oxide before hot pressing test}}$$

EXAMPLE

Hereinafter, the present invention will be described in more detail with reference to specific examples and test examples. These examples and test examples are provided only for illustration of the present invention and should be not construed as limiting the scope of the present invention.

All supports were produced in the form of a silicon dioxide nano-sphere or nanotube using tetraethyl orthosilicate (TEOS) as a silicon dioxide precursor. Then, cerium oxide was supported on silicon dioxide using cerium nitrate hexahydrate ($Ce(NO_3)_3 \cdot 6H_2O$) as a cerium precursor.

First, regarding conditions of examples and comparative examples of the present invention, as an ionomer for electrolyte membranes, a perfluorinated sulfonic acid-based ionomer (equivalent weight=725 g/$SO_3H$, 3M Co., USA) was used and the weight rate (=antioxidant content (g)/[ionomer content (g)+antioxidant content (g)]×100) of the antioxidant added to the electrolyte membrane (including the ionomer and the antioxidant) was set to 0.08% by weight (0.1% by weight, based on cerium oxide).

In addition, in order to uniformly disperse the antioxidant in the electrolyte membrane, the ingredients were mixed using a stirring bar for 12 hours. For improved dispersion, a physical dispersion method such as a surfactant and bead milling may be used. The antioxidant and ionomer dispersed well in a deionized water/ethanol mix solution were produced into a non-reinforced membrane by ionomer dispersion casting, dried at a temperature of 80° C. and then annealed at a temperature of 160° C.

Comparative Example

Comparative Examples 1 and 2

Cerium oxide ($CeO_2/SiO_2$) supported on the surface of a silicon dioxide nano-sphere support was produced. The silicon dioxide support had a nano-spherical shape and a diameter of about 50 nm.

Example

In the production of supports according to examples, regarding the particle size of silicon dioxide, lengths of nanotubes of all examples were adjusted to 50 nm to 150 nm by controlling the contents of nickel chloride, and tests were conducted.

Regarding the amount of cerium oxide supported on silicon dioxide nanotubes, the amount of cerium oxide was controlled to 1.3% by weight to 9.3% by weight, based on the total content of antioxidant (Examples 2 to 6).

The amount of cerium oxide supported on the silicon dioxide nanotube support was within the range of 0.100 to 0.394% by weight, based on the total weight of ionomers used to manufacture an electrolyte membrane (Examples 2 to 6).

Example 1

Cerium oxide (CeO2/SiO2) supported on the surface of a silicon dioxide nanotube support was produced. The silicon dioxide support had a nanotube shape and a length of about 50 nm.

Example 2

Cerium oxide ($CeO_2/SiO_2$) supported on the surface of a silicon dioxide nanotube support was produced. The silicon dioxide support had a nanotube shape and a length of about 50 nm. In addition, good support morphology was observed.

Examples 3 to 5

Cerium oxide ($CeO_2/SiO_2$) supported on the surface of a silicon dioxide nanotube support was produced. The silicon dioxide support had a nanotube shape and a length of about 50 nm. In addition, good support morphology was observed. In addition, the amount of cerium oxide supported was greater than that of Example 2 or 6.

Example 6

Cerium oxide ($CeO_2/SiO_2$) supported on the surface of a silicon dioxide nanotube support was produced. The silicon dioxide support had a nanotube shape and a length of about 150 nm. In addition, good support morphology was observed.

Meanwhile, ingredients and contents used for Comparative Examples 1 and 2, and Examples 1 to 6 are shown in Table 1 below.

TABLE 1

| Name of sample | Type of antioxidant | Shape of $SiO_2$ | Preparation process | Supported amount measured by EDS (wt %) |
|---|---|---|---|---|
| Comparative Examples 1 and 2 | $CeO_2/SiO_2$ | Nanosphere (diameter 50 nm) | Conventional | 4.6 |
| Example 1 | $CeO_2/SiO_2$ | Nanotube (length 50 nm) | Novel | — |
| Example 2 | $CeO_2/SiO_2$ | Nanotube (length 50 nm) | Novel | 1.3 |
| Examples 3 to 5 | $CeO_2/SiO_2$ | Nanotube (length 50 nm) | Novel | 9.3 |
| Example 6 | $CeO_2/SiO_2$ | Nanotube (length 150 nm) | Novel | 1.8 |

Evaluation and Analysis

Hereinafter, support characteristics of cerium oxide depending on the microstructure changes of silicon dioxide supports were compared.

First, regarding test conditions of image analysis, a transmission electron microscope (TEM) (Talos™200X FEI, USA) was used. In addition, support characteristics and crystal size of cerium oxide were analyzed by built-in element analysis (energy dispersive X-ray spectroscope, EDS) and high-angle annular dark field (HAADF) analysis. In addition, X-ray fluorescence (XRF, EDX-LE Shimadzu, Japan) was also conducted to verify the amount of cerium oxide supported.

Meanwhile, regarding test conditions of proton conductivity and fluoride emission rate, fluoride emission rate was calculated after measuring the weight of an electrolyte membrane sample dried in an oven at a temperature of 80° C. for 6 hours or longer, and allowing the electrolyte membrane sample to stand under Fenton test conditions (2% by weight of hydrogen peroxide, deionized water and 3 ppm of $Fe^{2+}$) at a temperature of 80° C. for 120 hours. The proton conductivity of the electrolyte membrane was measured under the conditions of a temperature of 65° C. and relative humidity of 50% using an impedance analyzer (Solartron 1260, Solartron Analytical Co., UK) and an interface (Solartron 1287, Solartron Analytical Co., UK).

Regarding respective comparative examples and examples, support characteristics and crystal size of cerium oxide were analyzed through analysis images shown in FIGS. 6 to 9. FIG. 6 shows the morphology of Comparative Example 1 produced in the form of silicon dioxide nanospheres. FIGS. 7 to 9 show morphologies of Examples 2 to 6 produced in the form of nanotubes.

In addition, non-reinforced electrolyte membranes with a thickness of 15±1 μm were produced from a neat cerium oxide antioxidant, and cerium oxide antioxidant samples of nanosphere-type Comparative Example 1 and nanotube-type Examples 2 to 6, and fluoride emission rate (FER), proton conductivity and migration stability test results (for comparison of migration) of the electrolyte membranes were measured to compare characteristics of the electrolyte membranes. Results are shown in Table 2.

TABLE 2

| | Items | | | | | | Fluoride | |
|---|---|---|---|---|---|---|---|---|
| | Antioxidant | Shape of $SiO_2$ | Preparation process | Supported amount measured by EDS [wt %] | Content of cerium oxide based on ionomer [wt %] | Weight of cerium moved by hot pressing [wt %] | emission rate (FER) of electrolyte membrane [μmol/(hr · g)] | Proton conductivity of electrolyte membrane [mS/cm] |
| Comparative Example (Neat) | — | — | — | — | — | — | 15.6 | 32.9 |
| Comparative Example 1 | $CeO_2$/$SiO_2$ | Nanosphere (50 nm) | Conventional | 4.6 | 0.100 | 45.3 | 8.1 | 31.9 |
| Example 2 | $CeO_2$/$SiO_2$ | Nanotube (50 nm) | Novel | 1.3 | 0.100 | 38.6 | 7.2 | 46.4 |
| Example 3 | $CeO_2$/$SiO_2$ | Nanotube (50 m) | novel | 9.3 | 0.100 | 37.9 | 6.8 | 36.2 |
| Example 4 | $CeO_2$/$SiO_2$ | Nanotube (50 nm) | Novel | 9.3 | 0.185 | 39.9 | 5.8 | 38.2 |
| Example 5 | $CeO_2$/$SiO_2$ | Nanotube (50 nm) | Novel | 9.3 | 0.394 | 40.6 | 3.8 | 39.2 |
| Example 6 | $CeO_2$/$SiO_2$ | Nanotube (150 nm) | Novel | 1.8 | 0.106 | 41.9 | 7.9 | 49.9 |

Comparative Example 1

Figure 6A:
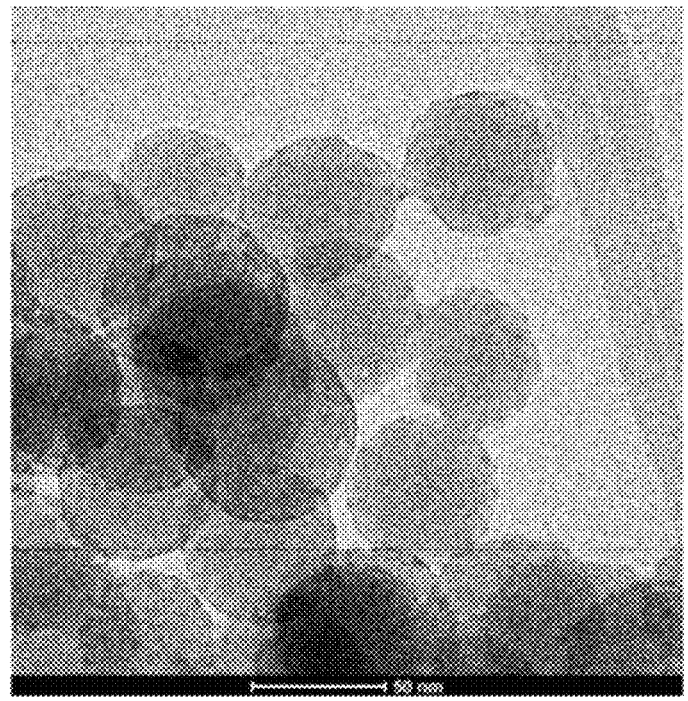
FIG. 6A shows a transmission electron microscopy (TEM) image of an antioxidant in Comparative Example 1.
Figure 6B:
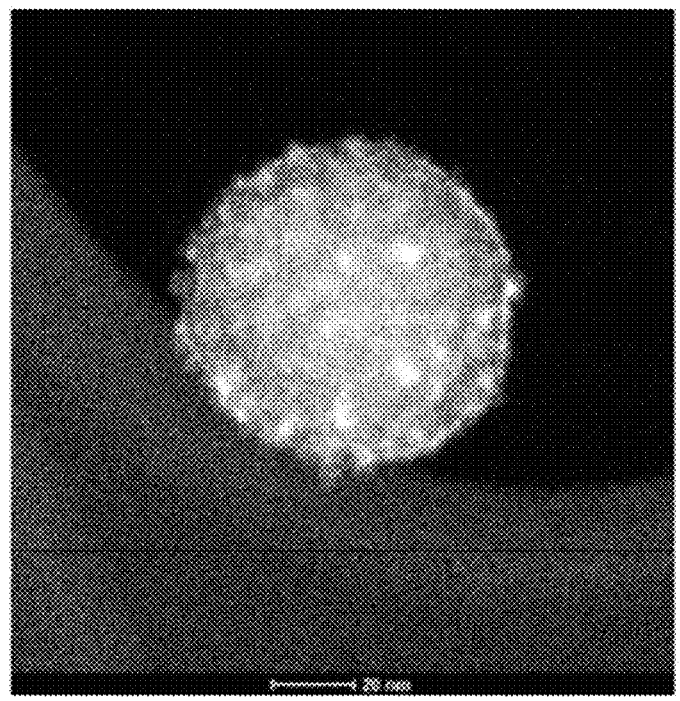
FIG. 6B shows a high-angle annular dark field (HAADF) analysis image of the antioxidant in Comparative Example 1.
Figure 6C:
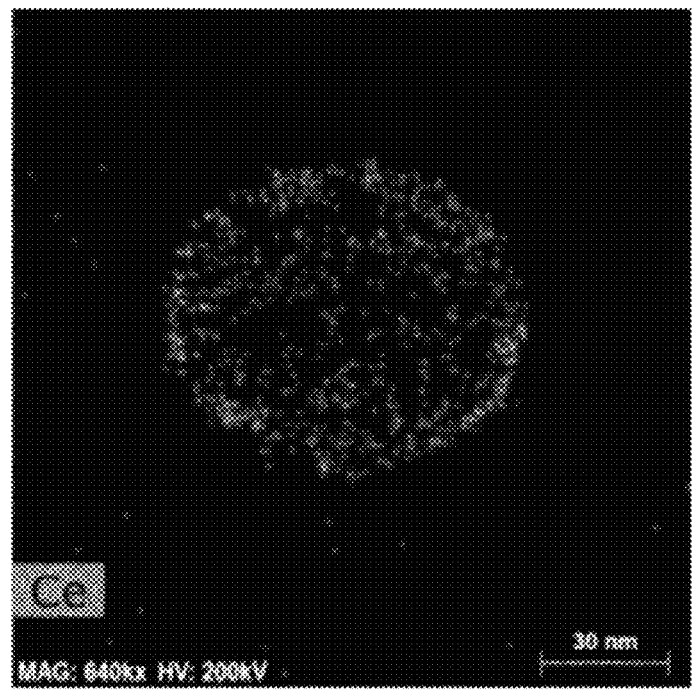
FIGS. 6C and 6D are energy dispersive X-ray spectroscopy (EDS) images illustrating cerium (Ce) support characteristics and silicon (Si) support characteristics, respectively, of the antioxidant in Comparative Example 1.
Figure 6D:
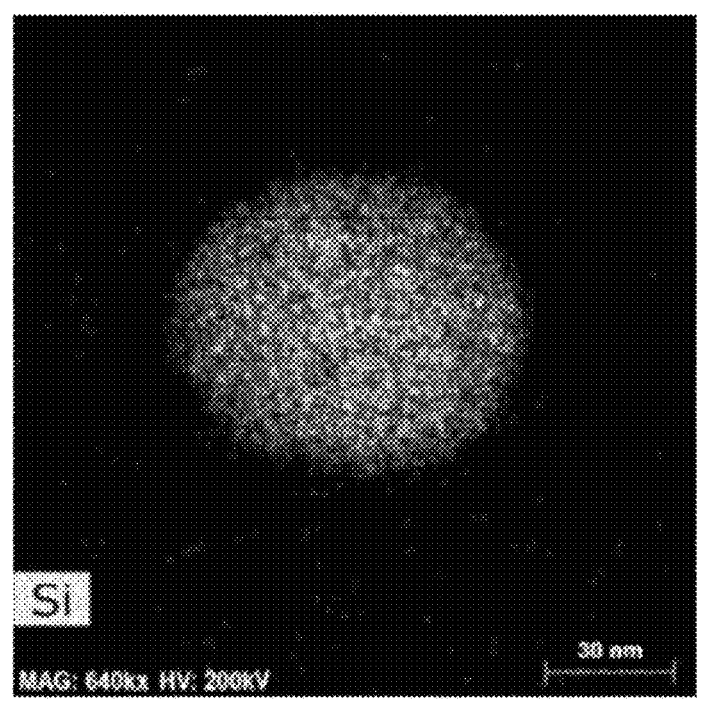

FIGS. 6A and 6B show a transmission electron microscopy (TEM) image and a high-angle annular dark field (HAADF) analysis image, respectively, of Comparative Example 1. FIGS. 6C and 6D show energy dispersive X-ray spectroscopy (EDS) images illustrating cerium (Ce) support characteristics and silicon (Si) support characteristics, respectively, of Comparative Example 1.

Meanwhile, Comparative Example 1, in which cerium oxide was supported on nano-spherical silicon dioxide, showed improved chemical durability of the electrolyte membrane due to considerably decreased fluoride emission rate, but reduction in proton conductivity, as compared to the neat cerium antioxidant.

Example 2

Figure 7A:
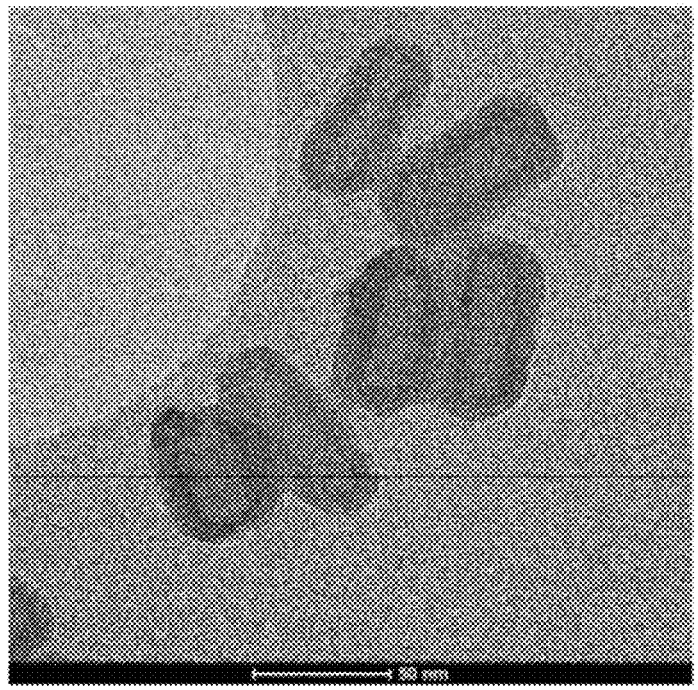
FIG. 7A is a transmission electron microscopy (TEM) image of an exemplary antioxidant in Example 2 according to an exemplary embodiment of the present invention.
Figure 7B:
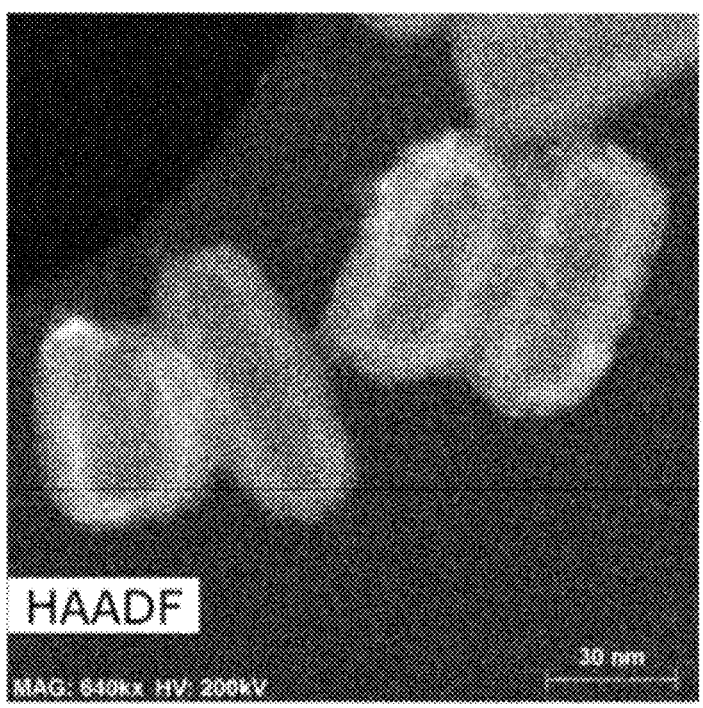
FIG. 7B is a high-angle annular dark field (HAADF) analysis image of an exemplary antioxidant in Example 2 according to an exemplary embodiment of the present invention.
Figure 7C:
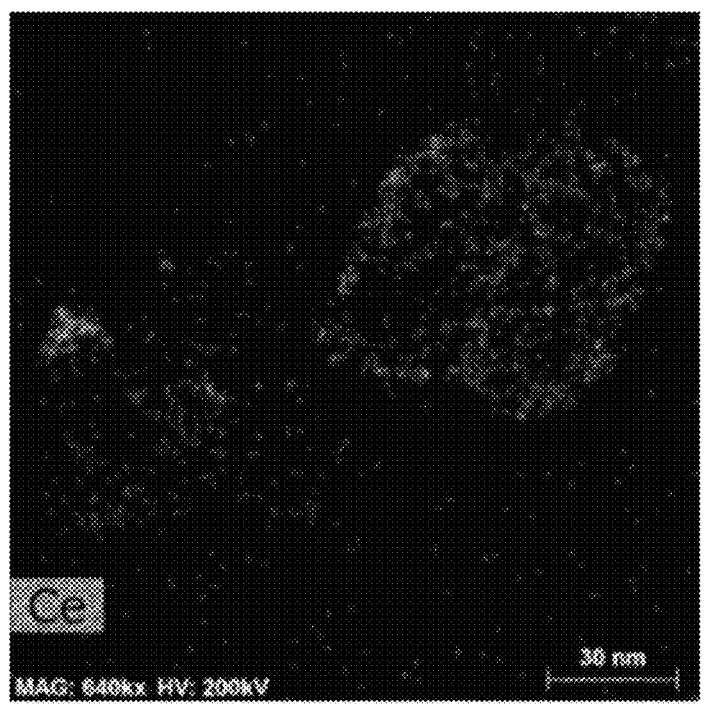
FIGS. 7C and 7D are energy dispersive X-ray spectroscopy (EDS) images illustrating cerium (Ce) support characteristics and silicon (Si) support characteristics, respectively, of an exemplary antioxidant in Example 2 according to an exemplary embodiment of the present invention.
Figure 7D:
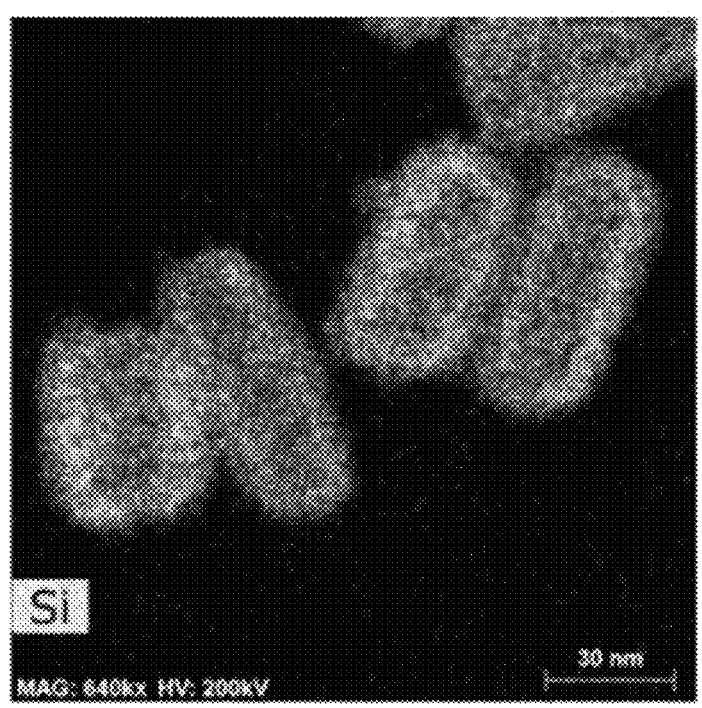

FIGS. 7A and 7B show a transmission electron microscopy (TEM) image and a high-angle annular dark field (HAADF) analysis image, respectively, of Example 2. FIGS. 7C and 7D show energy dispersive X-ray spectroscopy (EDS) images illustrating cerium (Ce) support characteristics and silicon (Si) support characteristics, respectively, of Example 2.

Examples 3 to 5

Figure 8A:
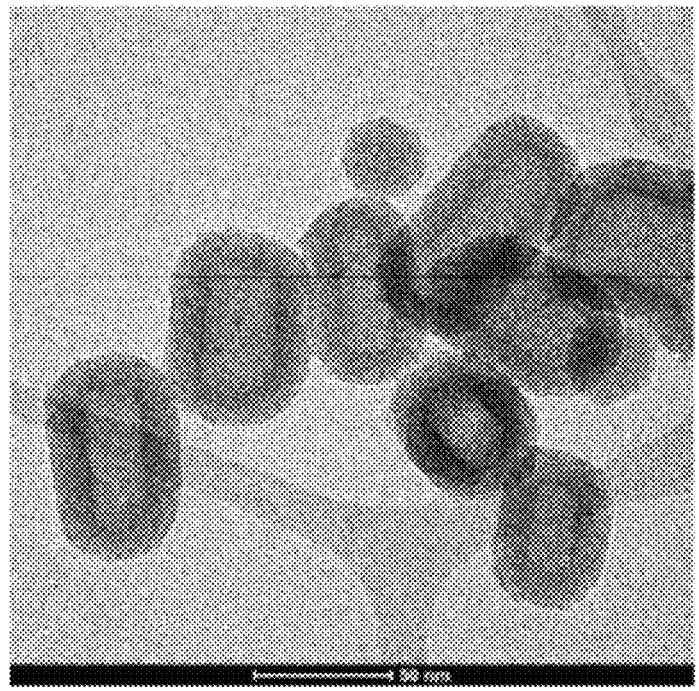
FIG. 8A is a transmission electron microscopy (TEM) image of exemplary antioxidants in Examples 3 to 5 according to an exemplary embodiment of the present invention.
Figure 8B:
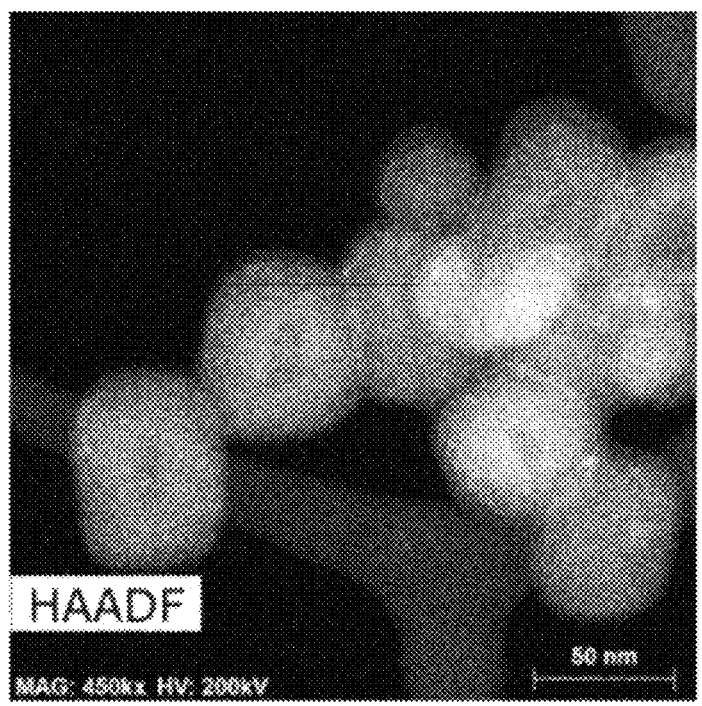
FIG. 8B is a high-angle annular dark field (HAADF) analysis image of exemplary antioxidants in Examples 3 to 5 according to an exemplary embodiment of the present invention.
Figure 8C:
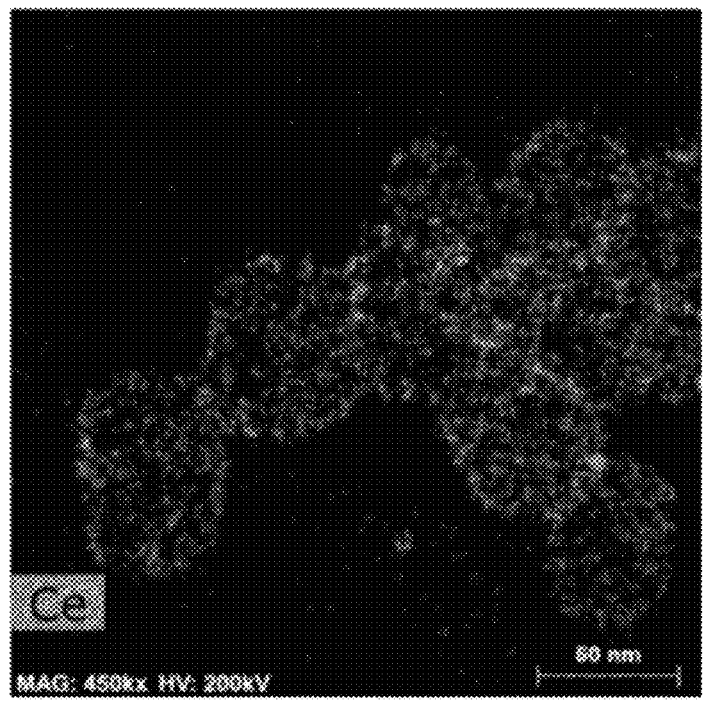
FIGS. 8C and 8D are energy dispersive X-ray spectroscopy (EDS) images illustrating cerium (Ce) support characteristics and silicon (Si) support characteristics, respectively, of exemplary antioxidants in Examples 3 to 5 according to an exemplary embodiment of the present invention.
Figure 8D:
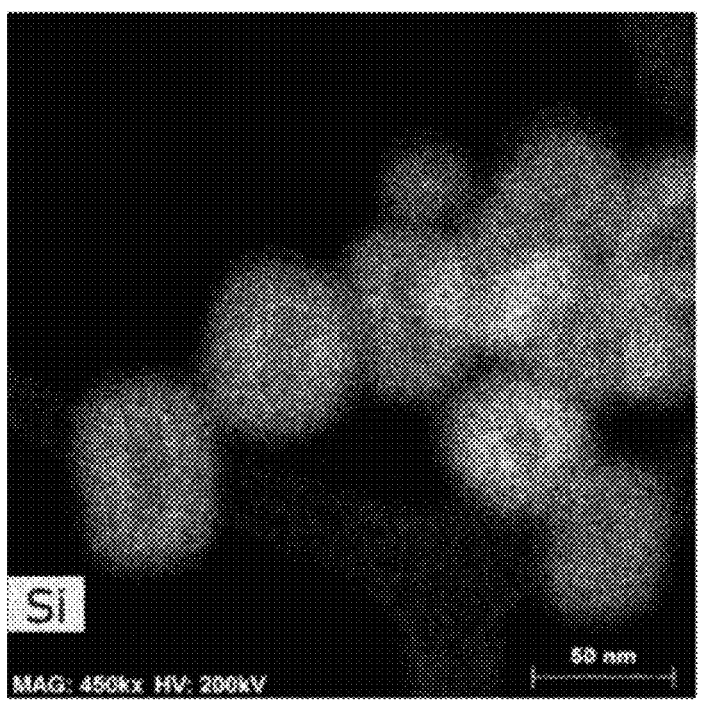

FIGS. 8A and 8B show a transmission electron microscopy (TEM) image and a high-angle annular dark field (HAADF) analysis image, respectively, of Examples 3 to 5. FIGS. 8C and 8D show energy dispersive X-ray spectroscopy (EDS) images illustrating cerium (Ce) support characteristics and silicon (Si) support characteristics, respectively, of Examples 3 to 5.

Example 6

Figure 9A:
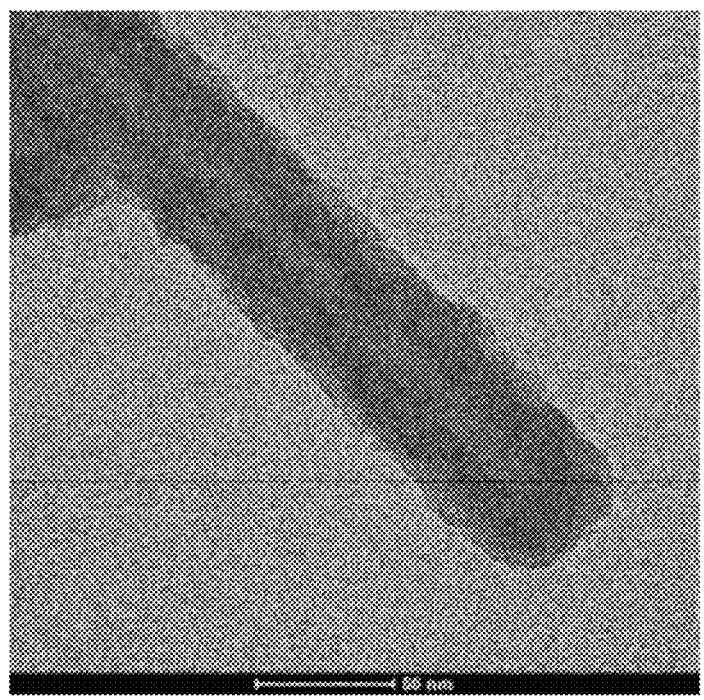
FIG. 9A is a transmission electron microscopy (TEM) image of an exemplary antioxidant in Example 6 according to an exemplary embodiment of the present invention.
Figure 9B:
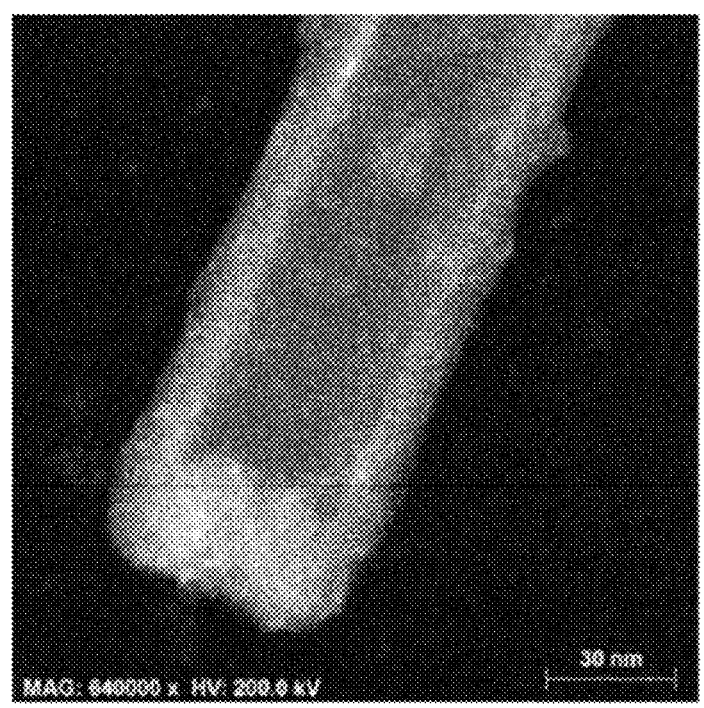
FIG. 9B is a high-angle annular dark field (HAADF) analysis image of an exemplary antioxidant in Example 6 according to an exemplary embodiment of the present invention.
Figure 9C:
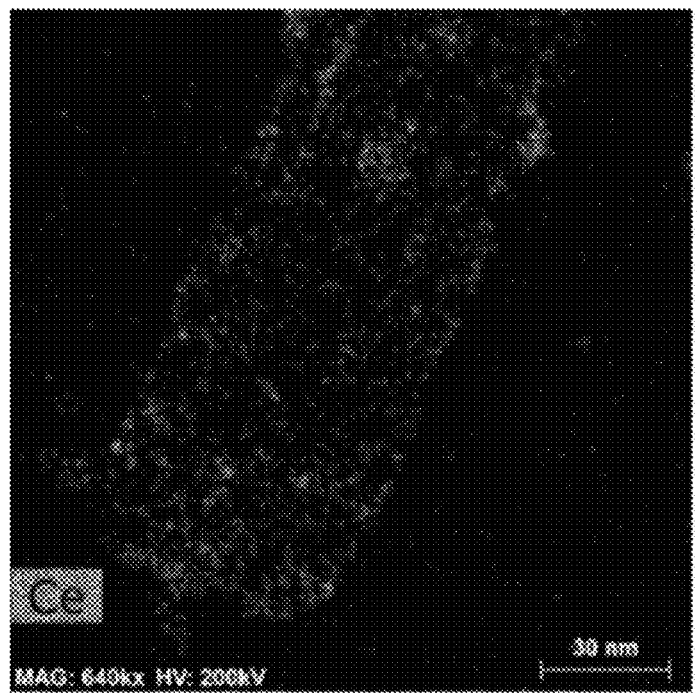
FIGS. 9C and 9D are energy dispersive X-ray spectroscopy (EDS) images illustrating cerium (Ce) support characteristics and silicon (Si) support characteristics, respectively, of an exemplary antioxidant in Example 6 according to an exemplary embodiment of the present invention.
Figure 9D:
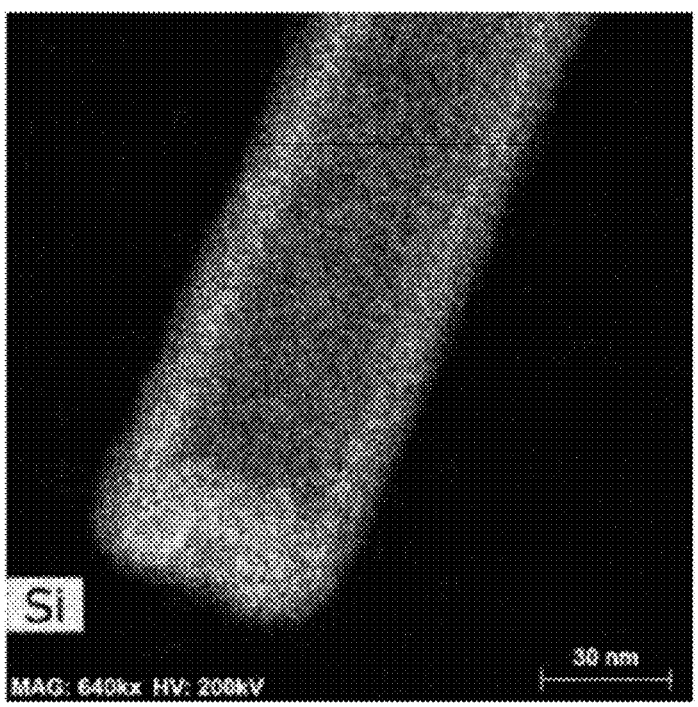

FIGS. 9A and 9B show a transmission electron microscopy (TEM) image and a high-angle annular dark field (HAADF) analysis image, respectively, of Example 6 FIGS. 9C and 9D show energy dispersive X-ray spectroscopy (EDS) images illustrating cerium (Ce) support characteristics and silicon (Si) support characteristics, respectively, of Example 6.

Meanwhile, Examples 2 to 6, in which cerium oxide was supported on nano-tubular silicon dioxide, showed improved chemical durability (dissolution stability) and proton conductivity of electrolyte membranes due to considerably decreased fluoride emission rate, but slight deterioration in proton conductivity, as compared to the neat cerium antioxidant and Comparative Example 1. At the same time, regarding migration, Examples 2 to 6 had less amounts of moved cerium in cerium oxide, as compared to Comparative Example 1. As such, as shown by movement after dissolution, which is a movement mechanism of cerium oxide, Examples 2 to 6 had excellent dissolution stability (resistance to dissolution).

Accordingly, when the antioxidant including cerium oxide is supported on silicon dioxide nanotubes, the cerium oxide antioxidant may be uniformly distributed over the silicon dioxide support, and thus may have high antioxidant activity, and the nanotube shape of hydrophilic silicon dioxide support may scavenge or absorb water well, thus increasing (not decreasing) proton conductivity. Accordingly, when the antioxidant including cerium oxide supported on silicon dioxide nanotubes is used for an electrolyte membrane, improved durability and increased proton conductivity may be imparted to the electrolyte membrane.

According to various exemplary embodiments of the present invention, for the antioxidant for electrolyte membranes of fuel cells and methods for manufacturing the same cerium-based antioxidants injected into electrolyte membranes may be supported and fixed on the surface of silicon dioxide, thereby improving dissolution stability based on chemical bonding.

In addition, cerium-based antioxidant crystal particles having a size less than the predetermined range may be supported, thereby improving antioxidant activity.

In addition, by improving bonding property of Si—O—Ce between cerium oxide introduced as a cerium precursor and silicon dioxide, antioxidants including cerium oxide may be in greater uniformity supported on silicon dioxide nanotubes.

In addition, since hydrophilic silicon dioxide nanotubes are used as supports, proton conductivity may be enhanced by improving water collection or absorption effects.

The invention has been described in detail with reference to various exemplary embodiments thereof. However, it will be appreciated by those skilled in the art that changes may be made in these embodiments without departing from the principles and spirit of the invention, the scope of which is defined in the appended claims and their equivalents.

What is claimed is:

1. An antioxidant for an electrolyte membrane of fuel cells comprising:
    a support comprising silicon dioxide and formed in a nanotube shape; and
    a metal oxide comprising a metal component and supported on the support,
    wherein the support has a length of about 20 nm to 300 nm,
    a silicon compound comprising one or more amine group is disposed on the support, and
    the metal oxide is supported on the support by a coordinate bond between a metal ion of the metal oxide and amine groups of the silicon compound.

2. The antioxidant of claim 1, wherein the silicon compound comprises 3-aminopropyl triethoxysilane.

3. The antioxidant of claim 1, wherein the metal oxide is supported on the support by forming by disposing one or more chelate compounds on the surface of the support, wherein the chelate compound is formed by a coordinate bond between a metal ion of the metal oxide and the silicon compound having two or more amine groups.

4. The antioxidant of claim 3, wherein the silicon compound comprises one or more selected from the group consisting of N-[3-(trimethoxysilyl)propyl]ethylene diamine, and N-{3-[dimethoxy(methyl)silyl]propyl}-1,2-ethanediamine.

5. The antioxidant of claim 1, wherein the metal oxide comprises one or more selected from pure cerium oxide ($CeO_2$) and modified cerium oxide.

6. The antioxidant of claim 5, wherein the modified cerium oxide comprises one or more selected from cerium-zirconium oxide ($Ce_{1-x}Zr_xO_2$, in which x is 0.2 to 0.8), cerium-manganese oxide ($Ce_{1-x}Mn_xO_2$, in which x is 0.2 to 0.8), cerium oxide-doped yttrium oxide, and cerium oxide-doped zirconium oxide.

7. The antioxidant of claim 1, wherein the antioxidant comprises the metal oxide in an amount of about 0.1% by weight to 30% by weight, based on the total weight of the antioxidant.

8. An electrolyte membrane for fuel cells comprising:
    an antioxidant for an electrolyte membrane of fuel cells of claim 1; and
    an ionomer.

9. The electrolyte membrane of claim 8, wherein a content of the metal oxide present is an amount of about 0.01% by weight to 5% by weight, based on the total weight of the ionomer.

10. A fuel cell comprising an antioxidant of claim 1.

11. A vehicle comprising a fuel cell of claim 10.

* * * * *